US012662429B2

(12) United States Patent
Callaway et al.

(10) Patent No.: US 12,662,429 B2
(45) Date of Patent: *Jun. 23, 2026

(54) CONTROLLED PARTICLE INJECTION IN FABRIC FOR IMPROVED MICROSTRUCTRE HOMOGENEITY IN CMCs

(71) Applicant: Raytheon Technologies Corporation, Farmington, CT (US)

(72) Inventors: Evan Benjamin Callaway, Hartford, CT (US); Brendan M. Lenz, Wethersfield, CT (US); Kathryn S. Read, Marlborough, CT (US); Sarah A. Frith, Layton, UT (US); Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 864 days.

This patent is subject to a terminal disclaimer.

(21) Appl. No.: 17/823,313

(22) Filed: Aug. 30, 2022

(65) Prior Publication Data

US 2023/0227366 A1 Jul. 20, 2023

Related U.S. Application Data

(60) Provisional application No. 63/239,726, filed on Sep. 1, 2021.

(51) Int. Cl.
C04B 35/80 (2006.01)
C04B 35/565 (2006.01)
(Continued)

(52) U.S. Cl.
CPC ............ C04B 35/565 (2013.01); C04B 35/80 (2013.01); C04B 41/009 (2013.01);
(Continued)

(58) Field of Classification Search
None
See application file for complete search history.

(56) References Cited

U.S. PATENT DOCUMENTS 5,562,788 A * 10/1996 Kitson .................. B29C 70/384
250/559.07
6,641,893 B1 11/2003 Suresh et al.
(Continued)

FOREIGN PATENT DOCUMENTS

CN 102448910 A 5/2012
CN 108779033 A 11/2018
(Continued)

OTHER PUBLICATIONS

International Preliminary Report on Patentability for PCT Application No. PCT/US2022/053178, Dated Jun. 20, 2024, pp. 5.
(Continued)

*Primary Examiner* — Melvin C. Mayes
(74) *Attorney, Agent, or Firm* — Kinney & Lange, P.A.

(57) ABSTRACT

A method for manufacturing ceramic matrix composites (CMC) and CMCs made by the method are disclosed. The method can be a manual process or an automated process, such as using a robotic system, that is used for controlled delivery of ceramic particles in a CMC fabric. The method includes identifying voids present between adjacent tows of the CMC fabric and dispensing ceramic particles into the voids. Applying the ceramic particles in the center of the voids reduces the size and volume fraction of the voids/defects, improving the homogeneity of surface texture of the preform, homogeneity of microstructure, and part model shape conformity. The method for manufacturing CMCs creates CMCs having a homogenous distribution of small pores after matrix formation that improves the interlaminar mechanical and thermal properties of the CMCs.

10 Claims, 2 Drawing Sheets

(51) Int. Cl.
  C04B 41/00 (2006.01)
  C04B 41/50 (2006.01)
  C04B 41/87 (2006.01)
(52) U.S. Cl.
  CPC .......... C04B 41/5025 (2013.01); C04B 41/87
    (2013.01); *C04B 2235/5244* (2013.01); *C04B*
    *2235/5436* (2013.01)

(56) References Cited

U.S. PATENT DOCUMENTS

| | | | |
|---|---|---|---|
| 7,837,914 B2 | 11/2010 | Kostar et al. | |
| 8,440,045 B2 | 5/2013 | Bremmer et al. | |
| 8,545,938 B2 | 10/2013 | Schmidt et al. | |
| 9,908,305 B2 | 3/2018 | Chamberlain et al. | |
| 10,822,281 B2 | 11/2020 | She et al. | |
| 10,829,418 B2 | 11/2020 | Jackson et al. | |
| 10,954,169 B2 | 3/2021 | Droz et al. | |
| 11,015,467 B2 | 5/2021 | Read | |
| 11,072,565 B2 | 7/2021 | Weaver et al. | |
| 12,330,994 B2 * | 6/2025 | Lenz ................. | C04B 35/62831 |
| 12,398,078 B2 * | 8/2025 | Read ..................... | C04B 35/565 |
| 2002/0141632 A1 * | 10/2002 | Engelbart ............. | G06T 7/0004 |
| | | | 382/141 |
| 2007/0099527 A1 | 5/2007 | Brun et al. | |
| 2007/0204555 A1 * | 9/2007 | Engelbart ............ | G05B 19/418 |
| | | | 52/741.1 |
| 2010/0119777 A1 | 5/2010 | Merrill et al. | |
| 2017/0348876 A1 | 12/2017 | Lin et al. | |
| 2018/0281228 A1 | 10/2018 | Godon et al. | |

| | | | |
|---|---|---|---|
| 2019/0048730 A1 | 2/2019 | Subramanian et al. | |
| 2019/0389171 A1 | 12/2019 | Nelson | |
| 2020/0078822 A1 | 3/2020 | Khattab et al. | |
| 2021/0239008 A1 | 8/2021 | Read | |
| 2022/0388913 A1 * | 12/2022 | Read ................... | C04B 35/6342 |
| 2023/0036697 A1 * | 2/2023 | Lenz ................. | C04B 35/62802 |
| 2023/0192561 A1 * | 6/2023 | Read ........................ | F01D 5/284 |
| | | | 428/325 |
| 2023/0407532 A1 * | 12/2023 | Lenz ..................... | C04B 35/565 |
| 2024/0116828 A1 * | 4/2024 | Jarmon ............... | C04B 41/4511 |

FOREIGN PATENT DOCUMENTS

| | | | | |
|---|---|---|---|---|
| CN | 111132954 A | 5/2020 | | |
| EP | 3650424 A1 | 5/2020 | | |
| EP | 4098637 A1 * | 12/2022 | ....... | C04B 35/62894 |
| WO | WO-9502081 A1 * | 1/1995 | ............. | C25D 13/02 |
| WO | WO-2014151066 A1 * | 9/2014 | ............. | C04B 30/02 |
| WO | WO-2016046788 A1 * | 3/2016 | ......... | G01N 29/2418 |
| WO | 2020209848 A1 | 10/2020 | | |
| WO | 2021005282 A2 | 1/2021 | | |

OTHER PUBLICATIONS

International Search Report and Written Opinion for PCT Application No. PCT/US2022/053178, Dated May 2, 2023, pp. 9.
Extended European Search Report for EP Application No. 22192952.4, Dated Feb. 3, 2023, pp. 8.
First Communication Pursuant to Article 94(3) EPC for EP Application No. 22192952.4, Dated Dec. 18, 2024, pp. 7.

* cited by examiner

Layup

Debulk

Densify

CONTROLLED PARTICLE INJECTION IN FABRIC FOR IMPROVED MICROSTRUCTRE HOMOGENEITY IN CMCs

This application claims the benefit of U.S. Provisional Application No. 63/239,726 filed Sep. 1, 2021, for "CONTROLLED PARTICLE INJECTION IN FABRIC FOR IMPROVED MICROSTRUCTRE HOMOGENEITY IN CMCs," are hereby incorporated by reference in their entirety.

BACKGROUND

The present invention relates to the fabrication of ceramic matrix composites and, more particularly, to a ceramic matrix composite having improved properties for operating in gas turbine engines.

Ceramic matrix composites are desirable for use in gas turbine engines due to their unique material properties including high temperature and oxidation resistance capabilities, high strength and creep resistance, high thermal conductivity, and low weight. During manufacture of the ceramic matrix composite components, voids are created between adjacent tows of the ceramic matrix composite component due to the cross-sectional shape of each individual tow. These voids are considered a defect in the ceramic matrix composite component because they create areas of weakness and reduced thermal resistance, among other issues.

SUMMARY

According to one aspect of the disclosure, a method of manufacturing ceramic matrix composite components is disclosed. The method includes the steps of: measuring a distance, area, and/or volume between adjacent tows of the CMC component; comparing the distance, area, and/or volume measurement data to a spacing, area, and/or volume threshold; identifying a void between adjacent tows of the CMC component based on the distance, area, and/or volume measurement data exceeding the spacing, area, and/or volume threshold; and applying ceramic particles into the identified void of the CMC component.

According to another aspect of the disclosure, a ceramic matrix composite component includes a plurality of ceramic fiber plies, wherein each of the plurality of ceramic fiber plies comprises a plurality of interconnected tows. A plurality of ceramic particles and/or ceramic particulates are positioned within voids between adjacent tows of each of the plurality of ceramic fiber plies.

DETAILED DESCRIPTION

This disclosure presents a method for manufacturing ceramic matrix composites (CMCs) and CMCs made by the method. The method can be a manual process or an automated process, such as using a robotic system, that is used for controlled delivery of ceramic particles in a CMC fabric.

The method includes identifying voids present between adjacent tows of the CMC fabric and dispensing a particle solution mixed with a binder into the voids. Injecting the particles in the center of the voids reduces the size and volume fraction of the voids/defects, improving the homogeneity of surface texture of the preform, homogeneity of microstructure, and part model shape conformity. The method for manufacturing CMCs creates CMCs having a homogenous distribution of small pores after matrix formation that improves the interlaminar mechanical and thermal properties of the CMCs.

Figure 1:
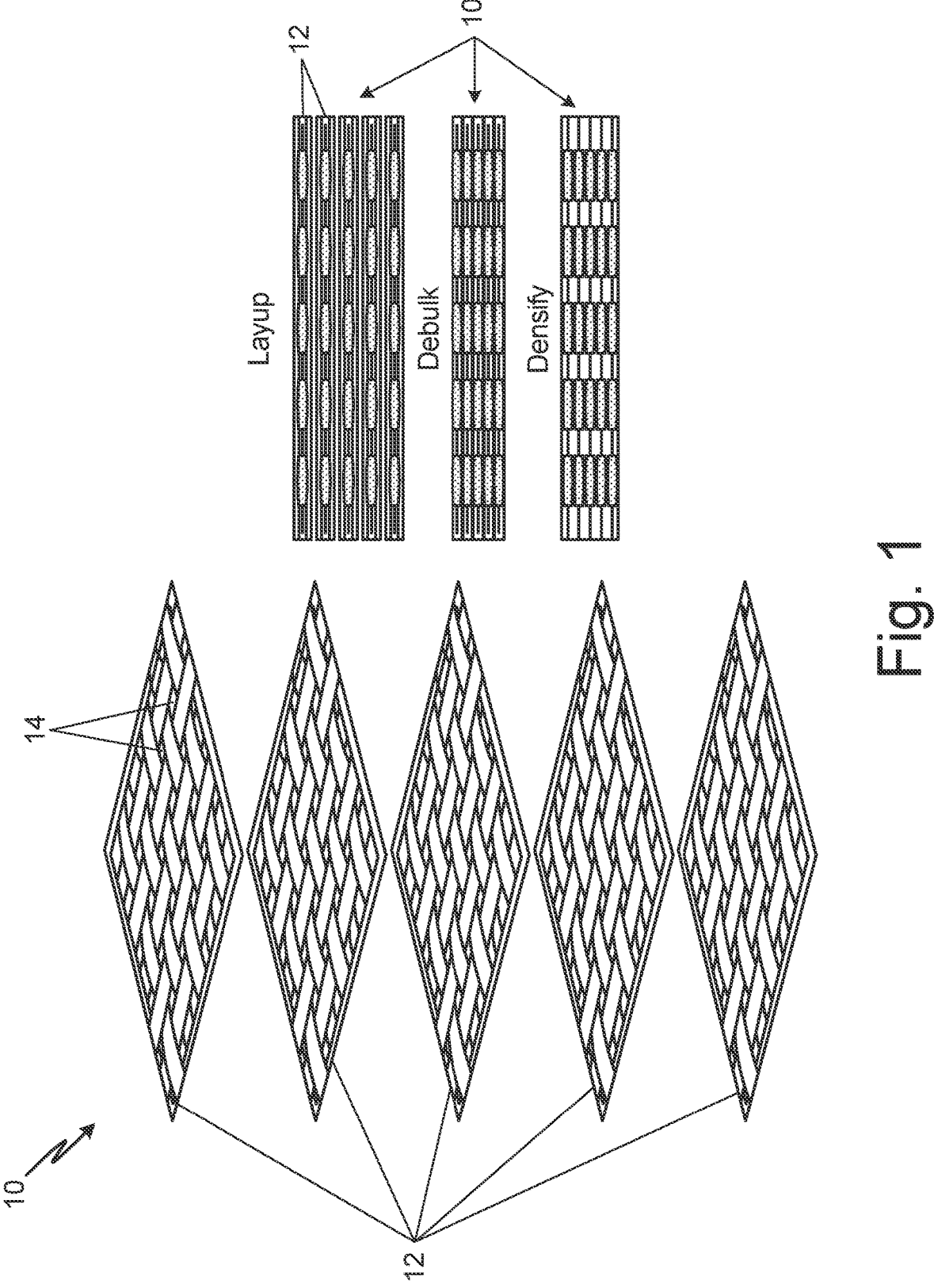
FIG. 1 provides side-by-side perspective and cross-sectional views of an example ceramic matrix composite layup across multiple process stages.

FIG. 1 provides a perspective view (left) and a cross-sectional view (right) of an example ceramic matrix composite (CMC) component 10 (hereinafter "CMC 10") across multiple layup process stages. As shown, CMC 10 can be constructed from one or more plies 12 arranged in a desired manner. As used herein, the term "ply" can be interchangeable with terms such as "sheet" and "fabric". Plies 12 can be formed from braided, woven, and/or non-woven ceramic fibers or tows, which in an exemplary embodiment, can be formed from silicon carbide. Other suitable ceramics are contemplated herein. Plies 12 can further be formed from unidirectional and/or multidirectional (including randomly oriented) fibers or tows. Exemplary plies 12 can have 5-harness or 8-harness weave or braided patterns. For a given CMC 10 formed from multiple plies 12, plies 12 can, but need not be uniform in their design (e.g., composition, thickness, shape, etc.). In the embodiment shown in FIG. 1, CMC 10 includes five plies 12 that are stacked, debulked, and densified to produce the resulting CMC 10. In another embodiment, CMC 10 can include more or less than five plies 12 that are stacked, debulked, and densified to produce the resulting CMC 10, discussed below. Further, CMC 10 can be a net shape or near-net shape and be a two or three-dimensional structure.

Once an individual ply 12 of CMC 10 is formed, ceramic particles 14 can be selectively applied to reduced fiber regions and/or voids between individual tows of ply 12 through methods described in detail below. Ceramic particles 14 can range in size from 10 micrometers to 100 micrometers, depending on the size of the tows used to construct ply 12. Suitable ceramic particles 14 can be formed from silicon carbide, boron carbide, silicon nitride, pure silicon, pure carbon, aluminum oxide, or hafnia, to name a few non-limiting examples. Ceramic particles 14 can be a homogeneous or heterogenous mixture of generally spherical, elongate, or otherwise irregularly shaped particles (e.g. short ceramic fibers). In one embodiment, the D50 size of ceramic particle 14 can range from 10 micrometers to 100 micrometers. In one embodiment, ceramic particles 14 can range from 30 micrometers to 65 micrometers, and more specifically, from 40 to 45 micrometers. The size and loading level of ceramic particles 14 used can vary depending on the size of the void and the location of each individual ply 12 within CMC 10. For example, a smaller sized particle 12 can be used to fill a smaller void within ply 12 positioned in the center (the third ply 12) of a stack of five plies 12. Additionally, a larger sized particle 12 can be used to fill a larger void within an outer (top or bottom) ply 12 of a stack of five plies 12. The size of ceramic particles 14 can be selectively chosen and applied to specific voids of CMC 10 to achieve the desired mechanical and thermal properties. In exemplary embodiments, smaller sized particles may generally be more desirable at or near the central layers since they have greater surface area and create smaller channels for gas flow when loaded at the same weight percentage in a given layer.

Further, ceramic particles 14 can be in a liquid suspension that can further include a polyvinyl alcohol and water solution or a polyvinyl butyral and ethanol solution, among other suitable binder solutions. The particle loading of the suspension can range from 1 to 30 weight percent, and in an exemplary embodiment, from 3 to 15 weight percent. Therefore, in some examples, ceramic particles 14 can be independently applied to the voids between adjacent tows of ply 12. In other examples, ceramic particles 14 can be in a liquid suspension with a binder solution and the slurry or mixture can be applied to the voids between adjacent tows of ply 12. In yet another example, ceramic particles 14 and the binder solution can be separately applied to the voids between adjacent tows of ply 12. In any embodiment, application of ceramic particles 14, the binder solution, and/or the slurry/ mixture in voids between adjacent tows of ply 12 can occur in one or multiple successive iterations to achieve the desired result.

In one embodiment, ceramic particles 14 are applied to the fabric prior to stacking and debulking. In this case, the space between tows can be identified and filled by the particle suspension with a binder. To help the process and ensure the particles remain in place prior to applying the ply to the stack, a release film can be used as backing to prevent the particles from falling through the fabric once the suspension is dried. In another embodiment, the fabric or ply is added to the stack and the voids are identified and filled with particle suspension directly on the stack before or after debulking. As such, any imperfections related to ply deformation or ply stacking discontinuities can be corrected.

Ceramic particles 14 can be selectively applied to reduced fiber regions and/or voids between individual tows of ply 12 through various methods. For example, ceramic particles 14 can be selectively applied to reduced fiber regions and/or voids through a manual process or an automated process, such as for example using a robotic system. In an example in which ceramic particles 14 are selectively applied using a manual process, a pipette, syringe, or other suitable alternative can be used to selectively apply ceramic particles 14 into the reduced fiber regions and/or voids. In an example in which ceramic particles 14 are selectively applied using an automated process, a nozzle can be used to selectively apply ceramic particles 14 into the reduced fiber regions and/or voids. The nozzle can be one or more of an ultrasonic nozzle, air spray nozzle, or other spray nozzle configured to dispense ceramic particles 14. Further, the nozzle can be an interchangeable multiple-outlet nozzle that includes a plurality of nozzles of differing sizes to accurately dispense ceramic particles 14 of varying sizes. The nozzle can be interchangeable to allow the nozzle to easily be cleaned or replaced during maintenance of the system. In either example, the pipette, syringe, or nozzle can be any component capable of dispensing or injecting ceramic particles 14 into voids within individual plies 12 of CMC 10.

To determine where ceramic particles 14 need to be selectively applied, visual inspection and/or distance measurement data can be used. In an example in which voids are identified using a manual process, a user or inspector can visually identify the voids based on void size and/or use a measurement device such as a caliper, a gauge, or other measurement device to measure the distance between individual adjacent tows of each ply 12 of CMC 10. In an example in which voids are identified using an automated process, a vision system can be used to measure the distance between individual adjacent tows of each ply 12 of CMC 10. The vision system can be one or more of a laser scanner, a white light scanner, a confocal microscope, and any other device capable of measuring the distance between individual adjacent tows of each ply 12 of CMC 10. In some examples, the distance measurement data, from either the manual process or the automated process, can be compared to a spacing threshold to determine if a void should be filled with ceramic particles 14.

The spacing threshold is a distance value that indicates that the distance between adjacent tows (voids) is larger than desired and could potentially result in reduced mechanical and thermal properties of CMC 10. The spacing threshold can be a user input value, a mathematically calculated value, or an experimental value, among other options. In some examples, the spacing threshold for a distance between adjacent tows of ply 12 of CMC 10 can range between 100 micrometers and 1500 micrometers. In some examples, the spacing threshold for the distance between horizontal tows can differ from the spacing threshold for vertical tows. In one example, the spacing threshold for the distance between horizontal tows can be greater than 200 micrometers and less than 500 micrometers, or more specifically greater than 300 micrometers and less than 400 micrometers. In another example, the spacing threshold for the distance between vertical tows can be between 100 micrometers and 300 micrometers, or more specifically between 150 micrometers and 250 micrometers. In other examples, the spacing threshold for the distance between horizontal tows can be the same as the spacing threshold for vertical tows of ply 12 of CMC 10. In examples in which a user manually visually inspects CMC 10 to identify voids, the spacing threshold can be greater than 1500 micrometers (1.5 millimeters). For example, voids greater than 1500 micrometers may be due to a missing tow caused by a weaving defect, such a defect can be noticeable by a human eye during manual visual inspection of CMC 10.

Another approach to determining where ceramic particles 14 need to be selectively applied can be through an area threshold and/or a volume threshold. The area threshold is an area value that indicates that the area of the void (2-dimensional) is larger than desired and could potentially result in reduced mechanical and thermal properties of CMC 10. The volume threshold is volume value that indicates that the volume of the void (3-dimensional) is larger than desired and could potentially result in reduced mechanical and thermal properties of CMC 10. The area and volume threshold can be a user input value, a mathematically calculated value, or an experimental value, among other options. In some examples, the area threshold of a void can range between 23,000 square micrometers (0.023 square millimeters) and 2,400,000 square micrometers (2.4 square millimeters). In some examples, the volume threshold of a void can range between 2,700,000 cubic micrometers (0.0027 cubic millimeters) and 550,000,000 cubic micrometers (0.55 cubic millimeters).

The area and volume threshold of a void can be determined for voids having any shape. In one example in which the void is rectangular in shape, the area of the void can be determined by multiplying the width and the length of the void; and the volume of the void can be determined by multiplying the area of the void by the thickness of ply 12. In another example in which the void is rhombus in shape, the area of the void can be determined by multiplying the diagonal width and the diagonal length of the void and then dividing by two. The volume of the rhombus shaped void can be determined by multiplying the area of the void by the thickness of ply 12. In another example in which the void is triangular in shape, the area of the void can be determined by multiplying the base width and the vertical height (perpendicular to the base) of the void and then dividing by two. The volume of the triangular shaped void can be determined by multiplying the area of the void by the thickness of ply 12. In any case, the area and/or volume of the voids can be compared to an area or volume threshold, respectively, to determine if the void should be filled with ceramic particles 14.

The distance measurement data (each measurement between adjacent tows), void area data, and void volume data are compared to the spacing threshold, area threshold, and volume threshold, respectively, to identify voids between adjacent tows of ply 12 that should be filled with ceramic particles 14. A void is defined as a gap or empty space between adjacent tows that exceeds the spacing threshold, area threshold, or volume threshold, and therefore can be a defect in ply 12 of CMC 10. Upon finding a void between adjacent tows that exceeds the spacing threshold, area threshold, or volume threshold, the pipette, syringe, nozzle, or other suitable device is used to dispense or inject ceramic particles 14 into the identified void, filling the void within ply 12 of CMC 10 before the debulking and densifying of CMC 10, improving the mechanical and thermal properties of CMC 10. The process of identifying and filling the voids within plies 12 can occur numerous times, until each void within plies 12 exceeding the spacing threshold are filled with ceramic particles 14.

After selectively applying ceramic particles 14 to reduced fiber regions and/or voids between adjacent tows of each ply 12, the individual plies 12 are stacked on top of each other and compressed to debulk CMC 10 and remove voids/spaces between individual plies 12 of CMC 10. For the CMC to remain the target debulked volume, a binder is necessary. Typical binders are composed of a polymer and a solvent. Further, during the debulking stage the solvent (alcohol/ethanol and/or water) is evaporated, leaving the binder polymer (polyvinyl/polyvinyl butyral and/or polyvinyl alcohol (PVA)) within the reduced fiber regions and/or voids. Once debulked, CMC 10 can undergo matrix formation and densification using a chemical vapor infiltration or deposition (CVI or CVD) process. During densification, the binder polymer is decomposed/burned out and plies 12 are infiltrated by reactant vapors, and a matrix material is formed. The matrix material can be a silicon carbide or other suitable ceramic material. Densification is carried out until the resulting CMC 10 has reached the desired residual porosity. In alternative embodiments, densification can include other methodologies including but not limited to melt infiltration and/or polymer infiltration and pyrolysis. The resulting CMC 10 components have desirable mechanical and thermal properties for harsh operating environments like the hot section of a gas turbine engine. Other aerospace applications include exhaust systems, ducting, shrouds, vanes, blades, and sealing systems. The disclosed method can also be used to produce CMC 10 components for maritime, power generation, and industrial applications.

The CMC 10 layup process discussed above can include additional steps (inter-step or post processing) that are not described with reference to FIG. 1. For example, various post-processing steps can be performed, such as the application of one or more protective coatings (e.g., environmental and/or thermal barrier coatings). A bond coat can also be applied to facilitate bonding between CMC 10 and a protective coating. Other protective coatings, especially those suitable for use in a gas turbine engine environment, are contemplated herein. Various inter-step processes can also be performed, such as the application of a tackifier to plies 12 at any point in the layup process. Other inter-step processes like surface preparation, cleaning, trimming, and machining are contemplated herein.

The method described is used for controlled delivery of ceramic particles 14 within plies 12 of CMC 10. The method includes identifying voids between adjacent tows of plies 12 of CMC 10 and dispensing ceramic particles 14 into the voids, prior to the debulking and densifying of CMC 10, to improve the interlaminar mechanical and thermal properties of CMC 10. Injecting ceramic particles 14 in the center of the voids reduces the size and volume fraction of the voids/defects, improving the homogeneity of surface texture of the preform, homogeneity of microstructure, and part model shape conformity. Further, injecting ceramic particles 14 between tows or plies 12 prevents a buildup of ceramic particles 14 on the exterior surface of plies 12, which can inhibit the layup process and cause reduced mechanical and thermal properties by creating a localized matrix on the exterior of plies 12. Therefore, the controlled infiltration of ceramic particles 14 in plies 12 prior to densification such as CVI is beneficial because it creates an engineered distribution of surface area to grow the matrix, creating a homogenous distribution of smaller pores that will increase the interlaminar mechanical and thermal properties of CMC 10.

Figure 2:
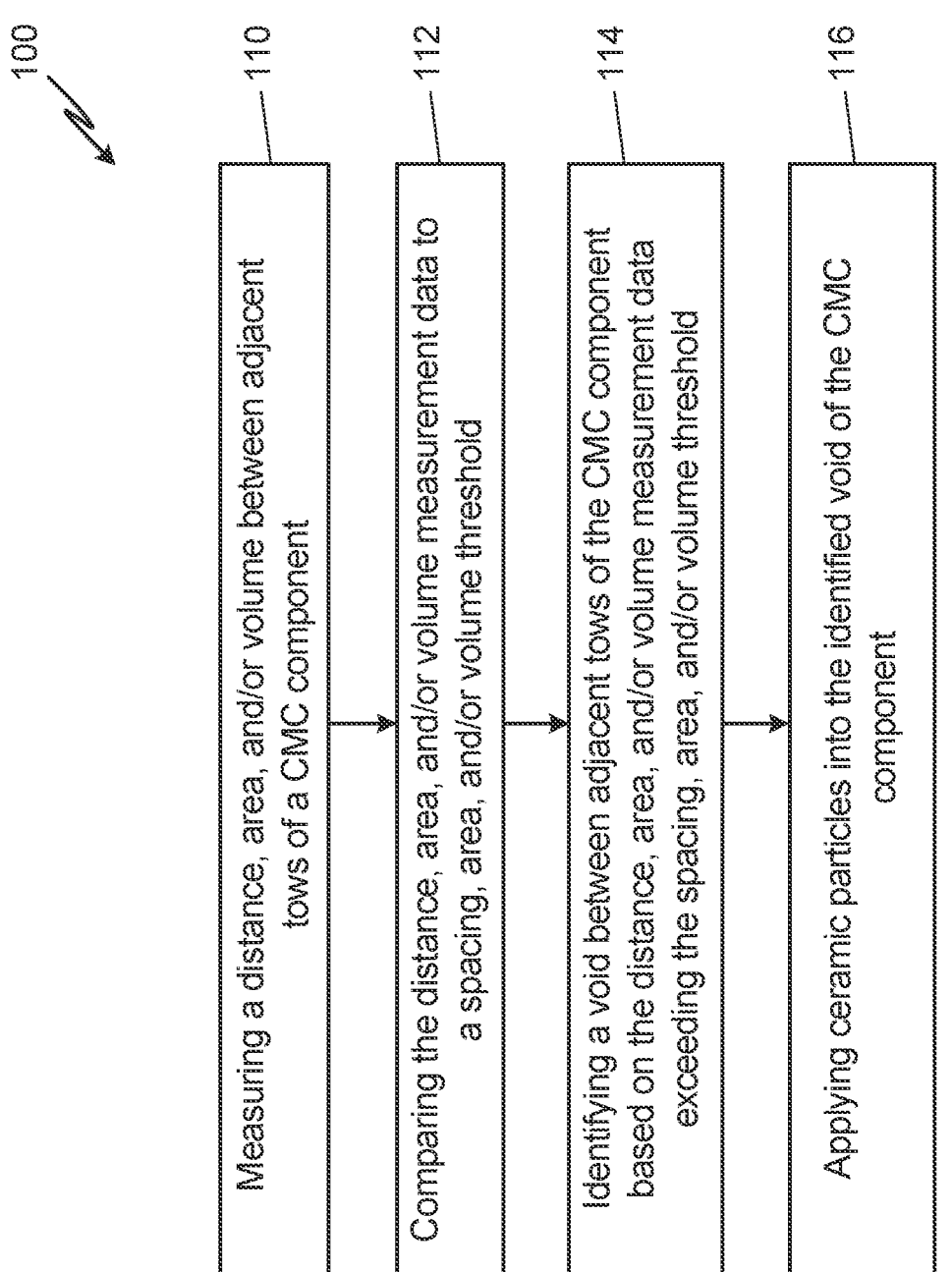
FIG. 2 is a flow chart illustrating steps of a method for manufacturing ceramic matrix composites.

FIG. 2 is a flow chart illustrating steps of a method 100 for manufacturing CMC 10. Method 100 for manufacturing CMC 10 includes steps 110, 112, 114, and 116, among other steps not specifically described. Step 110 includes measuring a distance, area, and/or volume between adjacent tows of plies 12 of CMC 10. Step 112 includes comparing the distance, area, and/or volume measurement data to a spacing, area, and/or volume threshold. Step 114 includes identifying a void between adjacent tows of plies 12 of CMC 10 based on the distance, area, and/or volume measurement data exceeding the spacing, area, and/or volume threshold. Step 116 includes applying ceramic particles 14 into the identified void of plies 12 of CMC 10. Method 100 for manufacturing CMC 10 can further include densifying CMC 10, such as for example through a chemical vapor infiltration (CVI) process after applying ceramic particles 14 into the identified void of ply 12 of CMC 10. Although not specifically described method 100 for manufacturing CMC 10 may include more or fewer steps than steps 110, 112, 114, and 116.

DISCUSSION OF POSSIBLE EMBODIMENTS

The following are non-exclusive descriptions of possible embodiments of the present invention.

A method of manufacturing ceramic matrix composite (CMC) components, the method includes measuring a distance, area, and/or volume between adjacent tows of the CMC component; comparing the distance, area, and/or volume measurement data to a spacing, area, and/or volume threshold; identifying a void between adjacent tows of the CMC component based on the distance, area, and/or volume measurement data exceeding the spacing, area, and/or volume threshold; and applying ceramic particles into the identified void of the CMC component.

The method of the preceding paragraph can optionally include, additionally and/or alternatively, any one or more of the following features, configurations and/or additional components:

The ceramic particles are applied into the identified void of the CMC component using one or more of a pipette, a syringe, and a nozzle.

The nozzle is one or more of an ultrasonic nozzle, air spray nozzle, or other spray nozzle.

Densifying the CMC component through one or more of a chemical vapor infiltration, chemical vapor deposition, melt infiltration, and polymer infiltration and pyrolysis process after applying the ceramic particles into the identified void of the CMC component.

The spacing threshold for a distance between adjacent tows of the CMC component ranges from 100 micrometers to 1500 micrometers.

The area threshold for an area between adjacent tows of the CMC component ranges from 23,000 square micrometers to 2,400,000 square micrometers.

The volume threshold for a volume between adjacent tows of the CMC component ranges from 2,700,000 cubic micrometers to 550,000,000 cubic micrometers.

The ceramic particles can be one or more of silicon carbide, boron carbide, silicon nitride, pure silicon, pure carbon, aluminum oxide, and hafnia.

The distance measurement data is gathered using one or more of a caliper, a gauge, and a vision system.

The vision system is one or more of a laser scanner, a white light scanner, and a confocal microscope.

The ceramic particles are applied into the identified void concurrently with a binder.

A ceramic matrix composite component includes a plurality of ceramic fiber plies, wherein each of the plurality of ceramic fiber plies comprises a plurality of interconnected tows. A plurality of ceramic particles and/or ceramic particulates are positioned within voids between adjacent tows of each of the plurality of ceramic fiber plies.

The ceramic matrix composite component of the preceding paragraph can optionally include, additionally and/or alternatively, any one or more of the following features, configurations and/or additional components:

The ceramic particles can be one or more of silicon carbide, boron carbide, silicon nitride, silicon, carbon, aluminum oxide, and hafnium oxide.

The length and width of the ceramic particles is between 10 micrometers and 100 micrometers.

The void is a gap or empty space between adjacent tows that ranges from 100 micrometers to 1500 micrometers.

A void is a gap or empty space between adjacent tows that has an area that ranges between 23,000 square micrometers and 2,400,000 square micrometers.

The void is a gap or empty space between adjacent tows that has a volume that ranges between 2,700,000 cubic micrometers and 550,000,000 cubic micrometers.

The plurality of interconnected tows are a plurality of one or more braided, woven, and non-woven tows, and the tows are formed from silicon carbide.

The plurality of ceramic fiber plies are stacked, debulked, and densified to form the ceramic matrix composite component.

Densifying the stack of ceramic fiber plies comprises one or more of a chemical vapor infiltration, chemical vapor deposition, melt infiltration, and polymer infiltration and pyrolysis process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manufacturing a ceramic matrix composite (CMC) component, the method comprising:
   at least one ply formed from a plurality of interconnected tows;
   measuring a distance, area, and/or volume between adjacent tows of the at least one ply to collect distance, area, and/or volume data;
   comparing the distance, area, and/or volume measurement data to a spacing, area, and/or volume threshold;
   identifying a void between adjacent tows of the at least one ply based on the distance, area, and/or volume measurement data exceeding the spacing, area, and/or volume threshold, wherein the spacing, area, and/or volume threshold is indicative of a void that is larger than desired;
   selectively applying ceramic particles into the identified void of the at least one ply stacking one or more of the at least one ply in a desired manner to form a stack of plies;
   debulking the stack of plies; and
   densifying the stack of plies to form the CMC component through one or more of a chemical vapor infiltration, chemical vapor deposition, melt infiltration, and polymer infiltration and pyrolysis process.

2. The method of claim 1, wherein the ceramic particles are selectively applied into the identified void of the at least one ply using one or more of a pipette, a syringe, and a nozzle.

3. The method of claim 2, wherein the nozzle is one or more of an ultrasonic nozzle, air spray nozzle, or other spray nozzle.

4. The method of claim 1, wherein the spacing threshold for a distance between adjacent tows of the CMC component ranges from 100 micrometers to 1500 micrometers.

5. The method of claim 1, wherein the area threshold for an area between adjacent tows of the CMC component ranges from 23,000 square micrometers to 2,400,000 square micrometers.

6. The method of claim 1, wherein the volume threshold for a volume between adjacent tows of the CMC component ranges from 2,700,000 cubic micrometers to 550,000,000 cubic micrometers.

7. The method of claim 1, wherein:
   the ceramic particles can be one or more of silicon carbide, boron carbide, silicon nitride, pure silicon, pure carbon, aluminum oxide, and hafnia.

8. The method of claim 1, wherein the distance measurement data is gathered using one or more of a caliper, a gauge, and a vision system.

9. The method of claim 8, wherein the vision system is one or more of a laser scanner, a white light scanner, and a confocal microscope.

10. The method of claim 1, wherein the ceramic particles are applied into the identified void concurrently with a binder.

* * * * *